G. C. JENNISON.
Oven.
No. 22,809.
Patented Feb. 1, 1859.
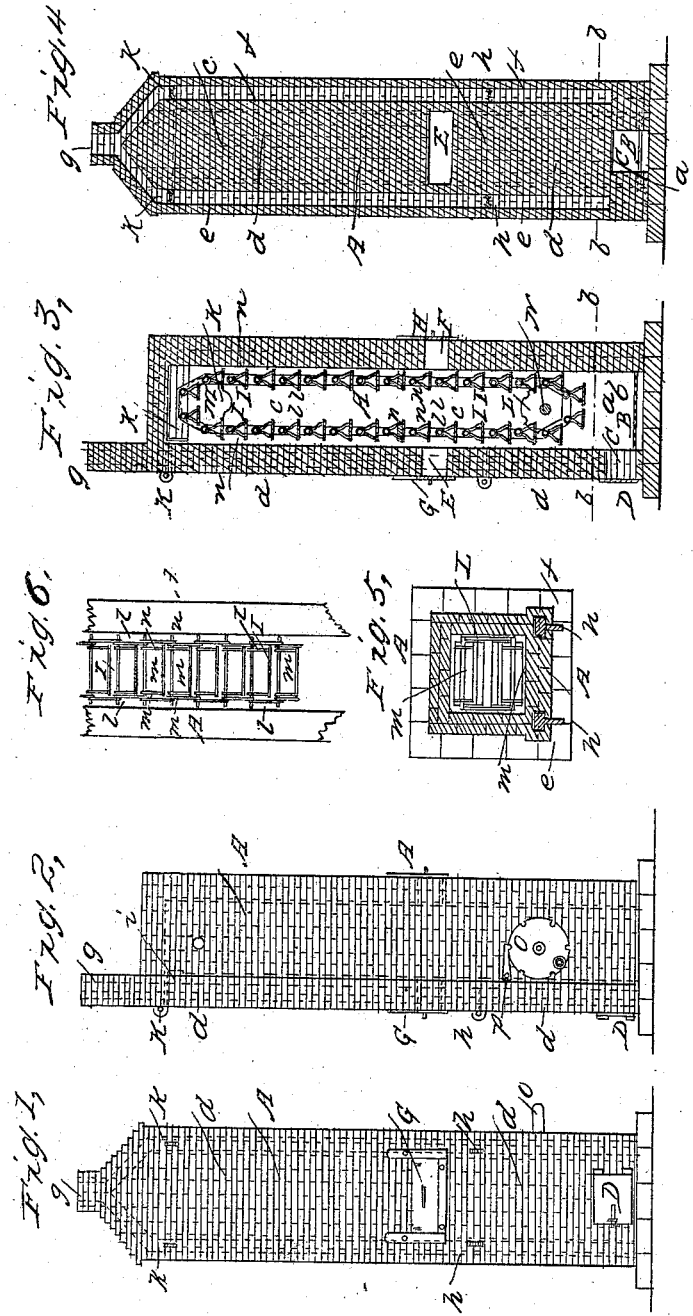

UNITED STATES PATENT OFFICE.

GEO. C. JENNISON, OF WARE, MASSACHUSETTS.

OVEN.

Specification forming part of Letters Patent No. 22,809, dated February 1, 1859; Reissued March 5, 1872, No. 4,783.

*To all whom it may concern:*

Be it known that I, GEORGE C. JENNISON, of Ware, in the county of Hampshire and State of Massachusetts, have invented an Improved Oven; and I do hereby declare that the same is fully described and represented in the following specification and the accompanying drawings, of which—

Figure 1, is a front elevation; Fig. 2, a side elevation; Fig. 3, a vertical and transverse section of it. Fig. 4, is a vertical section taken through the smoke flues. Fig. 5, is a horizontal section taken through the lower dampers; Fig. 6, is a side view of a portion of the endless carrier, and the pendulous shelves of the same.

My said improved oven is constructed on a different principle from any other known to me, for while in others, the furnace for heating the baking chamber is separate therefrom, so that while the fuel of the said furnace is in a state of ignition, the volatile products of combustion cannot be made to heat the baking chamber, except by the passage of the heat through partitions or brickwork, whereas in my oven, the baking chamber is a long hollow shaft, placed vertically and directly over the fire place, and made to open freely therein. At the junction of the fuel chamber and baking space, one or more discharge flues open out of the same, each of such flues being furnished with a damper at its lower end, and also at the upper part of the baking chamber, and in a passage leading out of the same and into the flue. Furthermore, openings of delivery and discharge are arranged in opposite sides of the lower part of the baking chamber and within the said baking chamber, and the furnace beneath it, an endless carrier furnished with pendulous shelves is arranged.

In the drawings, A denotes an elongated hollow, vertical column, square or about so in horizontal section and covered at top, the lower part of the space within the column being provided with a grate B, extending across it. An opening C made through the front wall of the hollow column B, and just above the grate is furnished with a door, D, and constitutes the mouth of the furnace or space, $a$, extended below the dotted line $b, b$, all the space above such line and marked $c$, being what may be termed as the baking chamber. Openings E, F, made through the front and rear walls of the column and at the lower part of the baking space are respectively furnished with sliding doors G, H, and serve to enable access to be had to the shelves of the endless carrier and for the purpose of supplying the same with dough or articles to be baked as well as for removing such as may have been baked.

In the front wall, $d$, are one or more flues $e, f$, which extend upward from and open out of the upper part of the furnace $a$, and terminate in a chimney $g$, the said flues at or near their opening into the furnace being respectively furnished with closing slides or valves $h, h$. These flues have other openings or passages $i, i$, leading into them from the upper part of the baking chamber, each of the said openings $i, i$, being provided with a closing slide or damper $k$.

Within the column A, or chamber thereof, is a long endless carrier I, which plays around sprocket wheels (or equivalents) K, K, L, L, fixed on two horizontal shafts M, N, arranged as shown in the drawings. From each of the hinge bars $l$ of the endless carrier, a shelf $m$, is suspended by arms $n, n$, which swing freely on the bar so as to enable the shaft by its gravitating power to always maintain its horizontal position at whatever altitude it may be or during the entire circuit of the carrier. On the outer end of the lower shaft of the endless carrier, a cranked and notched wheel $o$ may be fixed, a pawl $p$ serving to arrest its motion or that of the carrier by being thrown into one of the notches of the wheel.

In operating with this oven, it is calculated to use anthracite coal, but we are by no means confined to such fuel, as there are various other kinds which will answer. After the upper dampers have been closed and a fire has been built on the grate, the volatile products of combustion will escape into the flues by means of the openings at their lower ends, much of the heat from such passing upward into the banking chamber, by which means it will become rapidly heated.

The temperature within the baking chamber, may be controlled by means of the upper dampers as by withdrawing them more or less we open their passages into the flues, and allow more or less of the heated air, steam, etc., to escape.

The bread to be baked is to be supplied to the shelves of the carrier through the supply opening E, the carrier being supposed to have an intermittent movement imparted to it such as will run each shelf in succession up to the opening E, and there suffer it to remain long enough to receive its supply of dough. As the shelves pass upward into the baking space, their dough will be subjected to the action of the heat and will be baked within a vaporized atmosphere, one containing more or less distilled alcohol. As the shelves successively pass by the opening, F, the bread on them, may be removed from them through this latter opening.

The advantages of my improved oven over others, are, great economy in fuel; bread bakes without being smoked or injured in the least, and both evenly and thoroughly.

By my arrangement of the baking chamber with respect to the furnace and its flues, viz, so that the said baking chamber shall be vertically over the furnace and the flues open out of the upper part of the furnace or at the lower part of the baking chamber, the tendency of heat to rise vertically is availed of and the oven heated to the best advantage while the smoke from the furnace is discharged into the flues and does not pass up into the baking chamber to any injurious extent, while the baking process is being carried on.

The peculiar arrangement of the charging and discharging orifices E, F, of the baking chamber with reference to the same and the smoke eduction passages not only enables the dough to be applied to the endless carrier, but the baked bread to be removed from it, without either materially affecting the baking process of the oven or causing any smoke to escape through the said orifices, as the situation of the mouths of the flues is such as to cause the smoke to enter therein rather than pass upward and out of the openings E, F.

By means of the upper openings $i$, $i$, and their dampers, the heat in the baking chamber can be discharged into the flues whenever it may be greater than is required for baking purposes.

I do not claim an endless carrier in combination with and arranged in a baking chamber separated from a furnace or chamber of combustion by a partition wall or equivalent through which the heat from the furnace has to pass, in order to obtain access to the baking chamber, but What I do claim is—

1. The application of the baking chamber of the endless carrier to the furnace in such manner, that the air within the said baking chamber may come into direct contact with the furnace charge or heated volatile products arising therefrom and be heated thereby without the heat having first to pass through any dividing wall or partition or its equivalent.

2. I also claim the arrangement of the baking chamber with respect to the furnace and its discharge flues substantially as hereinbefore described and as represented in the drawings, whereby, the advantage of the ascending power of the heat is availed of, while the smoke is carried off by the flues.

3. I also claim the arrangement of the charging and discharging orifices of the baking chamber with reference to it, and the lower smoke eduction passage leading into the discharge flue of the oven.

4. I also claim the arrangement and application of the pendulous platforms and the endless carrier together and within the vertical baking shaft.

5. I also claim the combination and arrangement of one or more openings $i$, $i$, and their damper or dampers with the baking chamber and its furnaces and flues arranged as specified.

In testimony whereof I have hereunto set my signature.

GEORGE C. JENNISON.

Witnesses:
  C. W. E. TUFFEE,
  H. S. CROWELL.

[FIRST PRINTED 1911.]